United States Patent [19]

Counard et al.

[11] Patent Number: 5,414,983
[45] Date of Patent: May 16, 1995

[54] SELF CLEANING RAKE

[76] Inventors: Harrison Counard, Rte. 3, Box 381, Crivitz, Wis. 54114; Gary J. Counard, 7591 Cty. E, Oconto Falls, Wis. 54154

[21] Appl. No.: 169,406

[22] Filed: Dec. 20, 1993

[51] Int. Cl.6 .............................................. A01D 7/04
[52] U.S. Cl. ................................................ 56/400.20
[58] Field of Search ........... 56/400.08, 400.10, 400.19, 56/400.20, 400.18; 172/371, 372, 378

[56] References Cited

U.S. PATENT DOCUMENTS

| | | | |
|---|---|---|---|
| 1,452,984 | 4/1923 | Richards | 56/400.18 |
| 1,910,371 | 5/1933 | Thiemann | 56/400.2 |
| 2,126,719 | 8/1938 | Beall | 56/400.2 |
| 2,162,648 | 6/1939 | Slusher | 56/400.2 |
| 2,286,939 | 6/1942 | Swanson | 56/400.2 |
| 2,702,981 | 3/1955 | Reynolds | 56/400.2 |
| 2,855,746 | 10/1958 | Miller | 56/400.19 |
| 3,378,996 | 4/1968 | Wenglarz | 56/400.2 |
| 5,319,912 | 6/1994 | Giorgini | 56/400.19 |

FOREIGN PATENT DOCUMENTS 639311 6/1928 France .................. 56/400.2

Primary Examiner—Ramon S. Britts
Assistant Examiner—James A. Lisehora

[57] ABSTRACT

A garden rake with self cleaning capabilities comprising a frame member having a near end with a handle and a far end with projections terminating in annular bearing members, the annular bearing members spaced from each other and with the holes having a common axis perpendicular to the axis of the handle. A tine bar is provided in an elongated configuration with ends positioned within the holes for rotation. The tine bar has bearing surfaces adjacent to the bearing members to preclude lateral movement of the tine bar with respect to the handle. The tine bar also has downwardly extending tines spaced along the tine bar generally perpendicular to the plane containing the axes of the handle and the holes. A spring in a generally coil configuration with an extension is further provided. The coil of the spring is positioned over one short projection between the bearing surfaces with the extension extending into contact with the tine bar at one end to preclude the forward rotation of the tines. This allows for the rearward rotation of the tines against the urging of the spring whereby debris attached to the rake may be removed by moving the tines and tine bar along the ground in a direction away from the handle.

1 Claim, 2 Drawing Sheets

SELF CLEANING RAKE

BACKGROUND OF THE INVENTION

1. Field of the Invention

The present invention relates to a self cleaning rake and more particularly pertains to a rake with tines which may be pivoted rearwardly to allow a user to remove unwanted debris from the tines.

2. Description of the Prior Art

The use of garden rakes is known in the prior art. More specifically, garden rakes heretofore devised and utilized for the purpose of raking lawns and gardens are known to consist basically of familiar, expected, and obvious structural configurations, notwithstanding the myriad of designs encompassed by the crowded prior art which has been developed for the fulfillment of countless objectives and requirements.

By way of example, the prior art discloses various techniques for removing debris from the tines of rakes. Note U.S. Pat. No. 3,884,023 to Robinson. Consider also U.S. Pat. Nos. 4,776,158 to Baum and 4,850,185 to Dimon. These patents disclose devices where a stripping mechanism is moved linearly with respect to the tines for debris removal.

Another approach to debris removal is a stripper bar moving in an arcuant orientation with respect to the tines of a rake as disclosed in U.S. Pat. No. 4,165,598 to Kutsi.

Lastly, U.S. Pat. No. 3,636,689 to Gallimore discloses a rake with two sets of teeth which pivot with respect to a handle.

In this respect, a self cleaning rake according to the present invention substantially depart from the conventional concepts and designs of the prior art, and in doing so provide an apparatus primarily developed for the purpose of self cleaning rake tines.

Therefore, it can be appreciated that there exists a continuing need for a new and improved self cleaning rake which can be used for removing debris from the tines. In this regard, the present invention substantially fulfills this need.

SUMMARY OF THE INVENTION

In view of the foregoing disadvantages inherent in the known types of garden rakes now present in the prior art, the present invention provides an improved self cleaning rake. As such, the general purpose of the present invention, which will be described subsequently in greater detail, is to provide a new and improved self cleaning rake and methods which have all the advantages of the prior art and none of the disadvantages.

To attain this, the present invention essentially comprises a new and improved garden rake with self cleaning capabilities comprising, in combination, a frame member fabricated of a rigid material in an elongated configuration. Such member has a near end with a handle for being held by a user. In addition, the frame member also has a far end with laterally extended long projections terminating in forwardly extending short projections with annular bearing members at the ends thereof. The annular bearing members are spaced from each other by the length of the long projections. Also provided are holes having a common axis perpendicular to the axis of the handle. A tine bar is fabricated of a rigid material in an elongated configuration with ends positioned within the holes for rotation. The tine bar has bearing surfaces adjacent to the bearing members to preclude lateral movement of the tine bar with respect to the handle. In addition, the tine bar also has downwardly extending tines spaced therealong generally perpendicular to the plane containing the axes of the handle and the holes. Also provided is a spring in a generally coil configuration with an extension, the coil of the spring being positioned over one short projection between the bearing surfaces with the extension extending into contact with the tine bar at one end to preclude the forward rotation of the tines. This configuration allows for the rearward rotation of the tines against the urging of the spring whereby debris attached to the rake may be removed by moving the tines and tine bar along the ground in a direction away from the handle. A cotter pin extends through each short projection exteriorly of the ends of the tine bar.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved self cleaning rake which has all the advantages of the prior art garden rakes and none of the disadvantages.

It is another object of the present invention to provide a new and improved self cleaning rake which may be easily and efficiently manufactured and marketed.

It is a further object of the present invention to provide a new and improved self cleaning rake which is of a durable and reliable construction.

An even further object of the present invention is to provide a new and improved self cleaning rake which is susceptible of a low cost of manufacture with regard to both materials and labor, and which accordingly is then susceptible of low prices of sale to the consuming public, thereby making such a self cleaning rake economically available to the buying public.

Still yet another object of the present invention is to provide a new and improved self cleaning rake which provides in the apparatuses and methods of the prior art some of the advantages thereof, while simultaneously overcoming some of the disadvantages normally associated therewith.

Still another object of the present invention is to ease the burden on gardens when raking.

Yet another object of the present invention is to simplify the removal of debris from rake tines.

Lastly, it is an object of the present invention to provide a garden rake with self cleaning capabilities which comprises a frame member having a near end with a handle and a far end with projections terminating in annular bearing members, the annular bearing members spaced from each other and with the holes having a common axis perpendicular to the axis of the handle. A tine bar is provided in an elongated configuration with ends positioned within the holes for rotation. The tine bar has bearing surfaces adjacent to the bearing members to preclude lateral movement of the tine bar with respect to the handle. The tine bar also has downwardly extending tines spaced along the tine bar generally perpendicular to the plane containing the axes of the handle and the holes. A spring in a generally coil configuration with an extension is further provided. The coil of the spring is positioned over one short projection between the bearing surfaces with the extension extending into contact with the tine bar at one end to preclude the forward rotation of the tines. This allows for the rearward rotation of the tines against the urging of the spring whereby debris attached to the rake may be removed by moving the tines and tine bar along the ground in a direction away from the handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
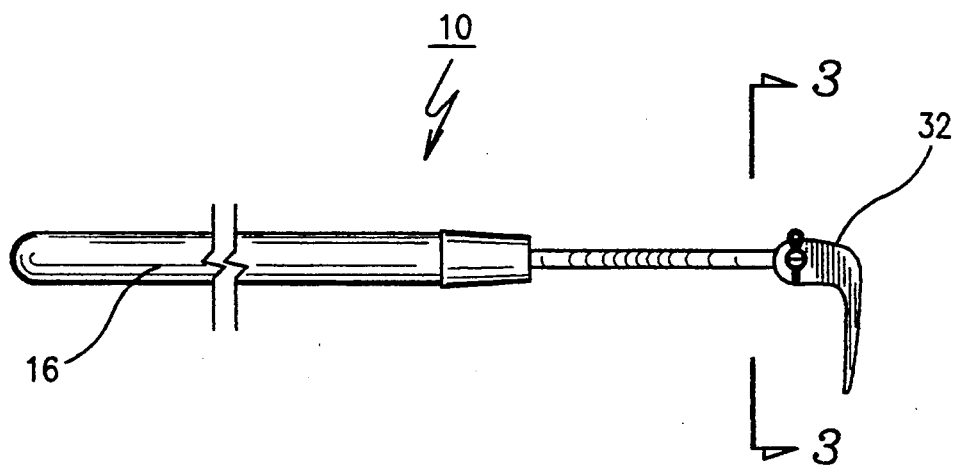
FIG. 1 is a side elevational view of a rake constructed in accordance with the principles of the present invention.
Figure 2:
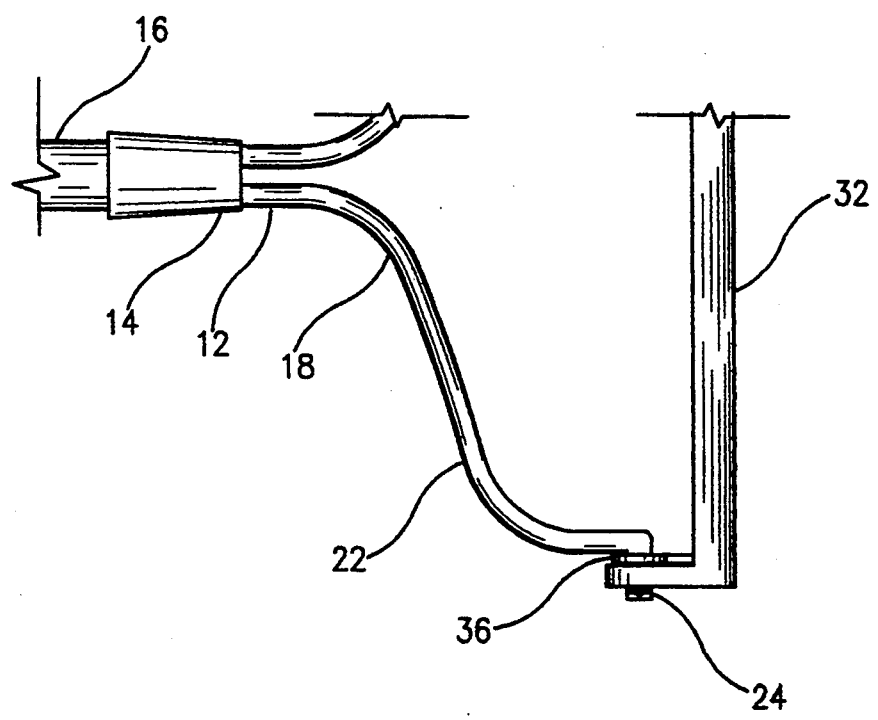
FIG. 2 is a top view of the end of the rake including the tine bar and coupling therebetween along with the tines in the raking orientation.
Figure 3:
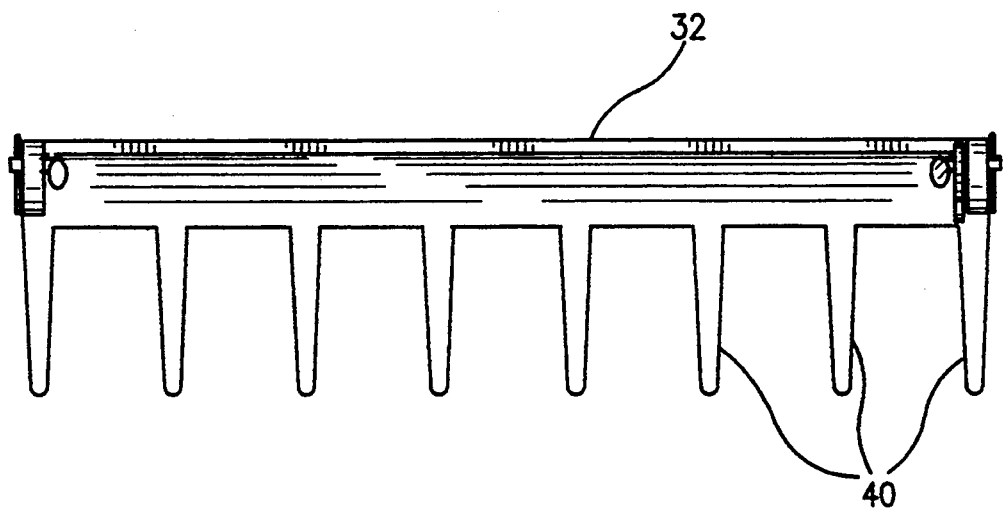
FIG. 3 is an end view of the rake and tine bar of FIG. 1 taken along line 3—3 of FIG. 1.
Figure 4:
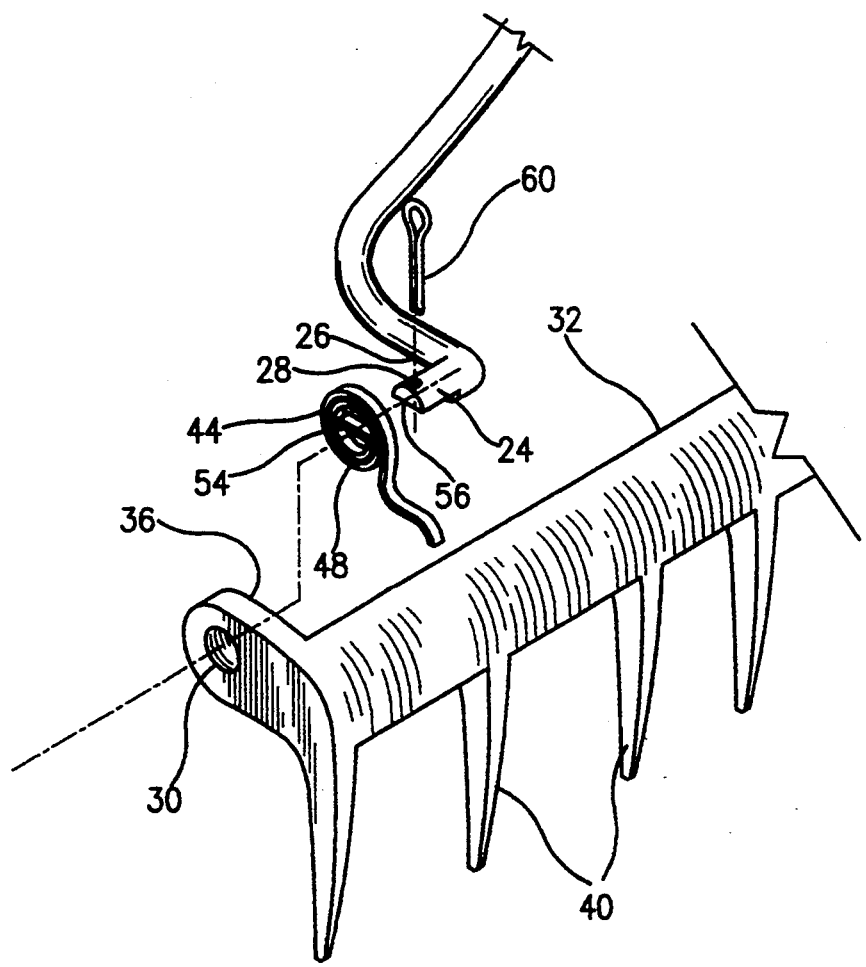
FIG. 4 is an enlarged exploded perspective view of a portion of the end of the rake and tine bar including the tines.

With reference now to the drawings, and in particular to FIG. 1 thereof, a new and improved a self cleaning rake embodying the principles and concepts of the present invention and generally designated by the reference numeral 10 will be described.

More specifically, it will be noted that there is shown in FIGS. 1 through 4, a garden rake 10. Such rake is provided with self cleaning capabilities. The rake comprises as its basic element a frame member 12 fabricated of a rigid material in an elongated configuration. The frame member has a near end 14 with a handle 16 for being held by a user. The frame member also has a far end 18 with laterally extended long projections 22. The long projections terminate in laterally extending short projections 24. Annular bearing surfaces 26 are located at the ends of the long projections 22 adjacent to the short projections 24.

The short projections have apertures 28 which are parallel with each other and perpendicular to an axis containing the short projections. Such axis is perpendicular to the axis of the handle 16. The short projections are spaced from each other by the length of the tine bar 32.

The next major component of the invention is a tine bar 32. The tine bar 32 is fabricated of a rigid material in an elongated configuration. The tine bar 32 has inturned ends which are formed with aligned holes 30 with the short projections 24 positioned within the holes 30 for rotation of the tine bar at the discretion of the user. The tine bar is thus located between the apertures 28 of the short projections. Each end of the tine bar has a radial bearing surface 36 adjacent to the bearing surfaces 26 on the long projections to preclude lateral movement of the tine bar with respect to the handle. The tine bar 32 also has tines 40 extending downwardly spaced along the tine bar perpendicular to the plane containing the axes of the handle and the axis about which the tine bar rotates.

Associated with the tine bar is a spring 44. The spring 44 is a strip of resilient material, preferably metal, formed into a coil 48 with a radially extending finger 50. One such spring 44 is located over one short extension 24 between the bearing surfaces 26 and 36 of the short projection and the tine bar. The coil 48 of the spring 44 is positioned over the short extent 24 with a flat region 54 in contact with a flat portion 56 formed on the short extension 24. This precludes rotation therebetween. The radially extending finger is in contact with the tine bar 32 at a location between the bearing surfaces. The finger 50, being a part of the spring 44, resiliently urges the tine bar 32 and tines 40 into the raking orientation. The spring 44 and its finger 50 also allows rotation of the tine bar 32 and tines 40 to the cleaning orientation and their return to the raking orientation.

The function of the spring and the contacted components thereadjacent is to preclude the forward rotation of the tines but to allow for the rearward rotation of the tines. Due to this relationship, debris attached to the tines of the rake may be removed by moving the tines and tine bar along the ground in a rotating direction away from the handle and then linearly along the ground. Lifting the tine and tine bar from the ground will allow the spring to return the tines to their raking orientation.

The last component of the rake 10 is a cotter pin 60. Each cotter pin 60 extends through an apertures 28 at the outermost end of the short projections 24. When positioned therethrough and expanded, the cotter pins preclude inadvertent lateral movement between the tine bar 32 and the short projections 24. When coupled with the relationship with the bearing surfaces 24 and 36, the tine bar and short projections will stay coupled during operation and use until the cotter pins 60 are removed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved garden rake with self cleaning capabilities comprising, in combination:

a frame member fabricated of a rigid material in an elongated configuration and having a near end with a handle for being held by a user, said handle extending forwardly along an axis, the frame member also having a far end with forwardly and laterally extending long projections terminating in laterally extending short projections, said long projections having first bearing surfaces at ends thereof, said first bearing surfaces being spaced from each other by a distance between the long projections and said short projections having a common axis perpendicular to the axis of the handle and with radial apertures extending through ends of the short projections;

a tine bar fabricated of a rigid material in an elongated configuration with inturned ends, the inturned ends having aligned holes with the short projections positioned within the holes for rotation of the tine bar, the tine bar being located between the apertures and having second bearing surfaces adjacent to said first bearing surfaces of said long projections to preclude lateral movement of the tine bar with respect to the handle, the tine bar also having downwardly extending tines spaced therealong generally perpendicular to a plane containing the axis of the handle and the holes;

a spring in a generally coil configuration with an extension, the coil of the spring being positioned over one short projection between said first and second bearing surfaces with the extension extending into contact with the tine bar at one end to preclude forward rotation of the tines but to allow for rearward rotation of the tines against an urging of the spring whereby debris attached to the rake may be removed by rotating the tine bar rearwardly around said short projections by pushing forward on the handle; and a cotter pin extending through the aperture of each short projection exteriorly of the ends of the tine bar.

* * * * *